Oct. 22, 1963
A. F. ERKE
3,107,935
INJECTION MOLDED SEAL DEVICE
Filed Nov. 13, 1961
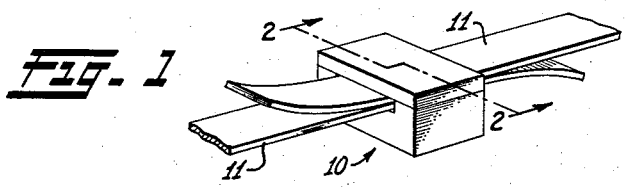
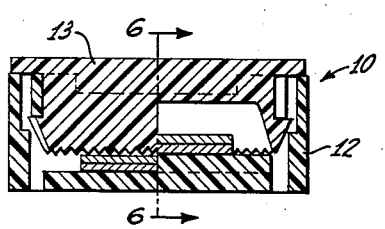
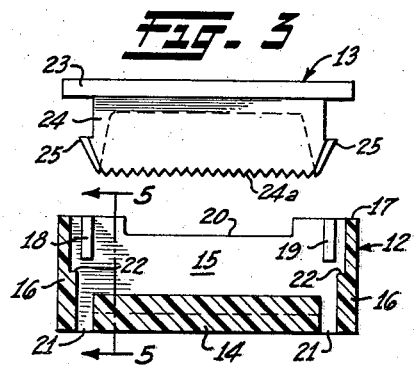
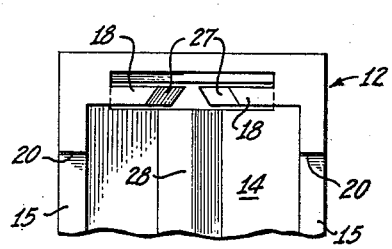
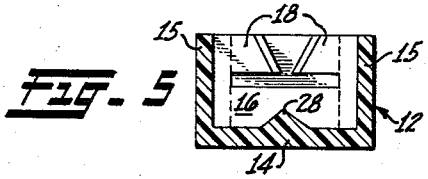
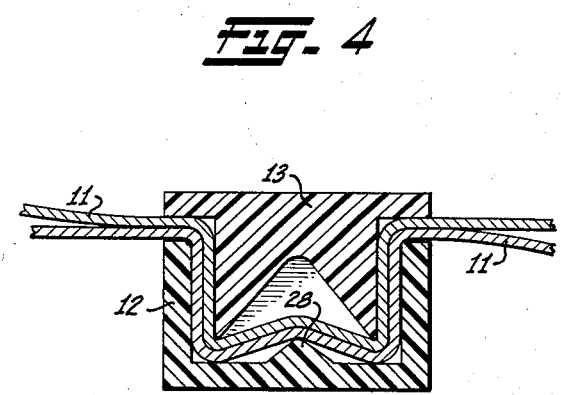
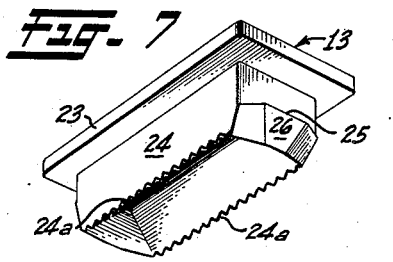
INVENTOR:
AUGUST F. ERKE
BY
Meelin and Hanscom
ATTORNEYS

United States Patent Office 3,107,935
Patented Oct. 22, 1963

3,107,935
INJECTION MOLDED SEAL DEVICE
August F. Erke, Mill Valley, Calif., assignor to J. F. Rhodes Co., San Francisco, Calif., a partnership
Filed Nov. 13, 1961, Ser. No. 151,726
8 Claims. (Cl. 292—325)

This invention relates to seal devices that, once closed, cannot be opened except by mutilation thereof. More particularly, the invention involves a seal device that may be economically produced from polychemical substances by injection molding procedures.

This seal device incorporates certain of the features described in my earlier United States Patent No. 2,988,391, but, by reason of more recent discoveries, it has been found that seal devices, as hereinafter described, may be produced by a less expensive set of molding dies, thereby contributing to a lower cost of manufacture. Furthermore, it will become evident that the novel seal structures which are contemplated may be more easily operated to effectuate an assembly between a receptacle and a plug assembly, which essentially comprise seal devices of this kind.

In brief, this invention in seal devices comprises a receptacle and a plug assembly, the receptacle having a cavity with integrally formed internal flanges providing catch edges for a plug member. While the flanges serve substantially the same purpose as the recessed portions of many conventional seal devices, it is noteworthy that the flanges may be formed by a two-part forming die, rather than the more complex and more costly molding dies which might otherwise be required.

It will become evident, therefore, that it is one object of this invention to provide a seal device that may be economically produced in mass quantity of a polychemical substance or plastic by means of injection molding.

A more particular object is to provide a seal device having a receptacle member formed with internal and integral flanges, said flanges being at least slightly flexible to allow a plug member to be inserted into the receptacle member.

Another object of this invention is to provide a seal device of the kind described and further wherein the receptacle includes a wall member having a thickened base portion at a level below the flange and vertically above the lip portion of a complementary plug member, thereby inhibiting access to the catch engagements between a flange and the lip portion when the seal is assembled.

Another object is to provide a seal device of the kind described and further wherein a plug member provides a tapered lip extending downwardly and inwardly from the outer edge of a flange-engaging shoulder, allowing an engaged flange to be gradually flexed outwardly relative to the plug when it is assembled into the cavity of the receptacle.

It is another object of this invention to provide a seal device of the kind described having a receptacle formed with a pair of opposed internal flanges extending toward one another from first and second side walls separated by an intermediate side wall, whereby said flanges provide lowermost catch edges that may be flexed at least slightly toward the intermediate side wall by the insertion of a plug member.

A further objetc is to provide a seal device of the kind described immediately above, having a pair of tapered flanges which define an opening therebetween, said opening having a V-shaped vertical profile or section for receiving the lip portion of a plug, thereby aligning the plug member relative to the cavity of the receptacle as the plug assembly is mated therewith.

And another of this invention is to provide a seal device of the kind described above and further wherein a pair of opposed flanges is tapered and defines an opening therebetween having a V-shaped horizontal profile or cross section for receiving the lip portion of a plug member, said lip portion also being tapered and extending downwardly and inwardly from the outer edge of a flange-engaging shoulder, thereby allowing the flanges to be gradually flexed outwardly relative to the lip portion when the plug is mated with the receptacle.

Other objects of this invention will become apparent in view of the drawings and the following detailed description.

In the drawings forming a part of this application and in which like parts are identified by like reference numerals throughout the same, FIG. 1 is a perspective view of a seal device such as might be constructed in accordance with the teaching of this invention, shown connected to the overlapped ends of a sealing band or ribbon;

FIG. 2 is a longitudinal section of the seal device, taken on lines 2—2 of FIG. 1;

FIG. 3 is an exploded view of the receptacle and plug assembly portions of the seal device, the receptacle being shown in longitudinal center section;

FIG. 4 is a plan view of a portion of the receptacle portion of the seal device;

FIG. 5 is a section taken on lines 5—5 of the receptacle as shown in FIG. 3;

FIG. 6 is a vertical section of the seal device, taken on lines 6—6 of FIG. 2; and FIG. 7 is a perspective view of the plug assembly.

Referring to FIG. 1, there is shown a seal device 10, such as now contemplated, that is affixed to the overlapped ends of a conventional sealing ribbon 11. From its outward appearance seal device 10 might be constructed in the manner disclosed in my United States Patent No. 2,988,391, and, in fact, certain features of that invention are utilized in the seal device 10, as hereinafter described. The novelty features of this device, therefore, are more clearly shown in FIGS. 2–7.

Seal device 10 is essentially comprised of two parts, a solid integrally formed receptacle 12 and a complementary mating plug assembly 13. Receptacle 12 has an internal rectangular cavity that is defined by a bottom wall 14 and two pairs of opposite side walls 15 and 16 having upper end surfaces 17. Two pairs of opposed flanges 18 and 19 are also formed integrally with the receptacle and within its cavity. These flanges provide lowermost catch edges for engaging a lip member upon plug assembly 12, and each flange may be flexed at least slightly toward its adjacent side wall 16. In addition, the upper end surfaces of side walls 15 are recessed or slotted to provide ribbon openings 20 from the receptacle cavity.

Receptacle 12, it will be noted, also has a pair of openings 21 formed through bottom wall 14 and vertically aligned with the flanges 18 and 19. These openings may be characterized as "forming openings" allowing the receptacle to be made economically by the mass production method of injection molding. More specifically, openings 21 are made by a portion of a die member that extends vertically upward to define the bottom surface of flanges 18 and 19.

It will be understood, of course, that the use of "forming openings" in the manufacture of seal devices would be unsuitable if such openings provide access to the internal latching mechanism of the seal. For, in this instance, the seal might be opened without being mutilated, thereby destroying its effectiveness as a seal. But, in the particular construction shown, each of the walls 16 is formed with a shoulder 22 and having a thickened base portion at a level slightly below the adjacent flanges. In view of the more particular description that follows, it will be evident that shoulder 22 helps to prevent access to the flanges 18 and 19, once the seal has been assembled.

The basic structure of receptacle 12 could be provided without utilizing "forming openings" such as 21 and still many of the desirable features of this invention could be retained. However, if openings 21 were to be eliminated, the injection molding process would require molding dies of greater complexity than a simple two-part molding die; and this would probably be true for any receptacle cavity having internal catch recesses, such as shown in my prior United States Patent No. 2,988,391.

Plug assembly 13 includes a rectangular lid 23 and a centrally located plug 24 having outwardly projecting lip members 25 formed at opposite ends thereof. Lip members 25 are located for engaging the under-surface of flanges 18 and 19 after the plug has been fully inserted into the receptacle cavity.

The projecting length of plug 24 is substantially equal to but less than the depth of the receptacle cavity. Thus, the lower serrated edges 24a of the plug are placed adjacent to the bottom surface of the receptacle cavity when the parts are assembled. In this manner, the edges 24a and the bottom wall 14 will clamp together upon the sealing ribbon 11, which is inserted therebetween before the parts are matingly joined. But, with most ribbon materials it will not be necessary to maintain precise dimension tolerances in producing the plug assembly and receptacle, for sufficient gripping strength may be derived from the multiple bends of the tortuous passageway between these parts.

To enhance the mating together of receptacle and plug assembly, lip members 25 and flanges 18 and 19 are particularly shaped and tapered. Lip members 25 are tapered downwardly and inwardly from the outer edge of a flange-engaging shoulder, thereby providing a camming land 26 (shown in FIG. 7). Similarly, camming lands 27 are symmetrically formed on each of the flanges 18 and 19, and the lands of each pair of flanges define openings therebetween, which openings are generally V-shaped in both the vertical and horizontal profiles or cross section. Now, upon inserting the plug 24 into the cavity of receptacle 12, the shape and arrangement of the flanges and lip members will produce an alignment of the plug and allow the flanges to be gradually flexed toward their respective side walls 16.

In assembling the seal device, lip members 25 will initially contact respective pairs of flanges 18 and 19, flexing them outwardly relative to the plug 24; and because of the tapers of the lip members and flanges, the plug will be properly aligned with the receptacle cavity. When lid 23 of the receptacle comes into contact with the upper surface 17 of side walls 15 and 16, the plug will then be fully inserted into the cavity, at which time lip members 25 will occupy positions beneath the flanges 18 and 19, allowing them to spring back into their unstrained condition and latching the plug assembly to the receptacle.

Referring to FIG. 2, it will be evident that it would be impossible to release the lip members 25 from latching engagement with flanges, except by a complete mutilation of the seal. Most importantly, although a wire or a knife blade might be extended through the forming openings 21, such devices cannot be placed into contact with flanges 18 or 19 since the passageway thereto is obstructed by the lip members 25. Moreover, since the lower thickened portion of walls 16 extends vertically beneath the lip members 25, there is no appreciable chance of providing a tool which could be hooked around the lip edges and engaged with any one of the flanges; and the security of the device is further insured by the use of two flanges at both ends.

It will be apparent, particularly in view of FIGS. 2 and 6, that assembled, seal device 10 defines a tortuous passageway much the same as contemplated in my earlier invention described in United States Patent No. 2,988,391. This passageway extends laterally beneath lid 23 and through ribbon opening 20 of the receptacle. The ribbon 11 is then caused to be directed downwardly between a side wall 15 and the adjacent side of plug 24; drawn across the serrated edge 24a on one side of the plug; passed around a raised portion 28 formed on the bottom wall 14; passed around the other serrated edge 24a of the plug; extended upwardly toward the ribbon opening 20 on the opposite side of the receptacle; and then projected laterally outward from the seal. Each bend in the ribbon will produce frictional engagement with the seal device, especially along the serrated edges 24a, thereby preventing slippage and accidental removal.

While a preferred embodiment of seal device has been illustrated and described, it will be apparent that various modifications and changes may be made without departing from the spirit of the invention or the scope of the appended claims, and each of such modifications and changes is contemplated.

Having thus described my invention what I claim and desire to secure by Letters Patent is:

1. A plastic seal device adapted to be formed by injection molding, comprising:

a receptacle having an internal rectangular cavity defined by a bottom surface and polyhedral side walls, a flange member formed integrally with said receptacle and within said cavity; said flange member extending substantially perpendicularly from one side wall, spaced above and in a plane perpendicular to said bottom surface, and proximate to but spaced from an adjacent side wall, whereby said flange member provides a lowermost catch edge that may be flexed at least slightly toward the adjacent side wall;

and a complementary mating plug assembly having a polygonal lid, a centrally located plug member projecting from one surface of said lid approximately equal to but less than the depth of said cavity, and an outwardly projecting lip member, all integrally formed, said lip member being located for engaging said flange upon insertion of said plug into said cavity, causing said flange member to flex laterally toward said adjacent side wall until disposed below said catch edge when said plug is properly inserted.

2. The seal device of claim 1 wherein said adjacent wall is formed with a shoulder having a thickened base portion at a level slightly below said flange member, and further wherein said bottom surface defines a forming opening vertically aligned with said flange member, the lip member extending vertically above said shoulder when said plug assembly is mated with said receptacle.

3. The seal device of claim 1 wherein said lip member is tapered downwardly and inwardly from the outer edge of a flange-engaging shoulder, thereby allowing said flange to be gradually flexed outwardly relative to said plug when said plug assembly is mated with said receptacle.

4. A plastic seal device adapted to be formed by injection molding, comprising:

a receptacle having an internal rectangular cavity defined by a bottom surface and polyhedral side walls, at least two pairs of opposed flanges formed integrally with said receptacle, the flanges of each pair extending toward one another from first and second side walls separated by an intermediate side wall, said pairs of flanges being spaced above and in a plane perpendicular to said bottom surface and spaced from their intermediate side walls, whereby said flanges provide lowermost catch edges that may be flexed at least slightly toward their respective intermediate side walls;

and a complementary mating plug assembly having a polygonal lid, a centrally located plug member projecting from one surface of said lid approximately equal to but less than the depth of said cavity, and outwardly projecting lip members, all integrally formed, each of said lip members being located for engaging one pair of said flanges upon insertion of said plug into said cavity, causing said flanges to flex laterally toward respective intermediate side walls and outwardly relative to said plug until disposed below said flanges and latching under said catch edges when said plug is properly inserted.

5. The seal device of claim 4 wherein each pair of flanges is tapered and defines an opening therebetween having a V-shaped vertical cross section for receiving the lip portions of said plug, thereby aligning said plug relative to said cavity as said plug assembly is mated with said receptacle.

6. The seal device of claim 4 wherein each pair of flanges is tapered and defines an opening therebetween having a V-shaped horizontal cross section for receiving the lip portions of said plug, said lip portions being tapered and extending downwardly and inwardly from the outer edge of a flange-engaging shoulder, thereby allowing said flanges to be gradually flexed outwardly relative to said plug when said plug assembly is mated with said receptacle.

7. A plastic seal device adapted to be formed by injection molding, comprising:
   a receptacle having an internal rectangular cavity defined by a bottom surface and first and second pairs of opposed side walls,
   a first and second pairs of opposed flanges formed integrally with said receptacle and within said cavity, one flange of said first pair and one flange of said second pair projecting substantially perpendicular from one side wall of said first pair of side walls, the other flange of said first and second pairs projecting substantially perpendicular from the other side wall of said first pair of side walls, the flanges of each pair extending toward one another and being respectively proximate to one side wall of said second pair of side walls,
   said flanges being spaced above and in a plane perpendicular to said bottom surface and spaced from the side wall of said second pair to which they are proximate, whereby said flanges provide lowermost catch edges that may be flexed at least slightly toward the second side walls to which they are respectively proximate;
   and a complementary mating plug assembly having a rectangular lid, a centrally located plug projecting from one surface of said lid approximately equal to but less than the depth of said cavity, and two outwardly projecting lip members, all integrally formed, one of said lip members located for engaging said first pair of opposed flanges and the other lip member being located for engaging said second pair of opposed flanges upon insertion of said plug into said cavity, causing said pairs of flanges to flex toward respective side walls of said second pair of side walls until disposed below said flanges, latching under said catch edges when said plug is properly inserted.

8. The seal device of claim 7 wherein said second pair of side walls are each formed with a shoulder having a thickened base portion at a level slightly below respective pairs of opposed flanges, and further wherein said bottom surface defines a pair of forming openings respectively and vertically aligned with said pairs of opposed flanges.

References Cited in the file of this patent

UNITED STATES PATENTS

| | | |
|---|---|---|
| 1,916,003 | Laencher | June 27, 1933 |
| 2,988,391 | Erke | June 13, 1961 |

FOREIGN PATENTS

| | | |
|---|---|---|
| 379,123 | Great Britain | Aug. 25, 1932 |